US011576033B2

(12) United States Patent
Cakulev et al.

(10) Patent No.: US 11,576,033 B2
(45) Date of Patent: Feb. 7, 2023

(54) SYSTEMS AND METHODS FOR UTILIZING LIMITS TO DETERMINE POLICY DECISIONS NOT RELATED TO SESSION MANAGEMENT

(71) Applicant: Verizon Patent and Licensing Inc., Basking Ridge, NJ (US)

(72) Inventors: Violeta Cakulev, Milburn, NJ (US); James Mathison, Warren, NJ (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 180 days.

(21) Appl. No.: 17/184,185

(22) Filed: Feb. 24, 2021

(65) Prior Publication Data
US 2022/0272520 A1   Aug. 25, 2022

(51) Int. Cl.
*H04W 4/50* (2018.01)
*H04W 8/18* (2009.01)
*H04W 60/00* (2009.01)
*H04W 4/24* (2018.01)

(52) U.S. Cl.
CPC ............. *H04W 8/183* (2013.01); *H04W 4/24* (2013.01); *H04W 4/50* (2018.02); *H04W 60/00* (2013.01)

(58) Field of Classification Search
None
See application file for complete search history.

(56) References Cited

FOREIGN PATENT DOCUMENTS

WO   WO-2021156771 A1 *  8/2021

* cited by examiner

*Primary Examiner* — Gary Lafontant

(57) ABSTRACT

A network device may receive a request for determination of a first non-session management policy control decision for a UE, and may provide an account limits request to another network device based on the request. The network device may receive, from the other network device, account limits for the UE, and may determine a first non-session management policy control service for the UE based on the account limits. The network device may cause the UE to be provisioned with a service based on the first non-session management policy control service, and may receive a request for determination of a second non-session management policy control decision for the UE. The network device may determine a second non-session management policy control service for the UE based on the account limits, and may cause the UE to be provisioned with a service based on the second non-session management policy control service.

20 Claims, 8 Drawing Sheets

_US 11,576,033 B2_

SYSTEMS AND METHODS FOR UTILIZING LIMITS TO DETERMINE POLICY DECISIONS NOT RELATED TO SESSION MANAGEMENT

BACKGROUND

A policy control function (PCF) may provide protocol data unit (PDU) session management policy control to a session management function (SMF), access and mobility related policy control information to an access and mobility management function (AMF), and a user equipment (UE) access selection and PDU session related policies to a UE.

DETAILED DESCRIPTION OF PREFERRED EMBODIMENTS

Figure 1A:
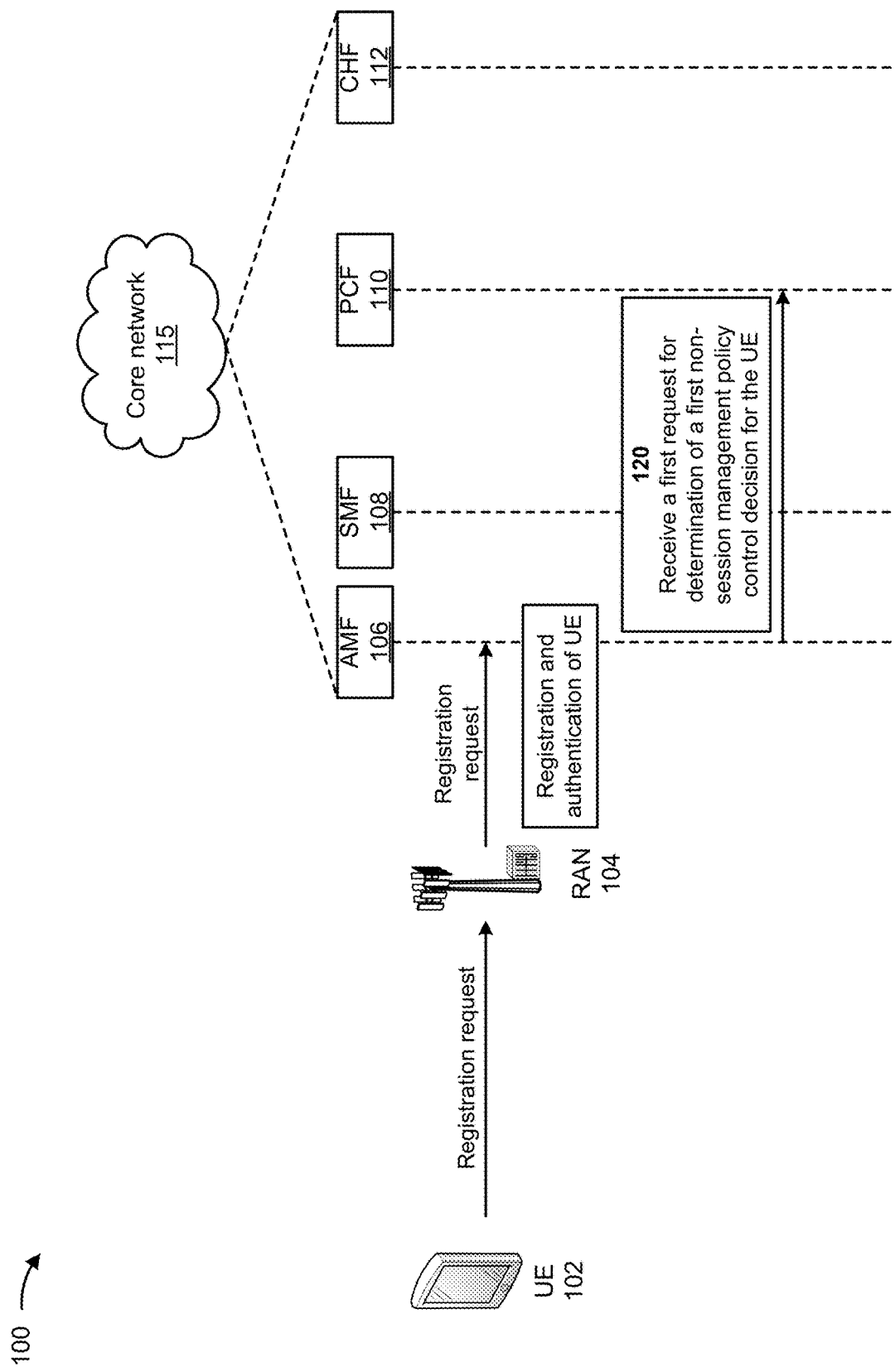
FIGS. 1A-1E are diagrams of an example associated with utilizing limits to determine policy decisions not related to session management.

The following detailed description of example implementations refers to the accompanying drawings. The same reference numbers in different drawings may identify the same or similar elements.

A PCF uses session management policies to control quality of service (QoS) and charging characteristics of subscriber data sessions. The PCF uses access and mobility policies for example to control service area restrictions (e.g., a list of allowed tracking area identities (TAIs), non-allowed TAIs, and/or the like) and to specify a radio access technology (RAT)/frequency selection priority (RFSP) index that defines spectrum permissions that apply to a UE. A policy and charging rules function (PCF) uses UE policies, for example, to control access network discovery and selection policy information (e.g., wireless local area network (WLAN) selection information, non-3$^{rd}$ Generation Partnership Project (3GPP) interworking function (N3IWF) selection information, evolved packet data gateway (ePDG) selection information, and/or the like), and UE route selection policy (URSP) information (e.g., association of an application with a PDU session, slice selection, and/or the like).

The SM PCF may make policy decisions based on account limits (e.g., spending limits, data rate limits, data usage limits, and/or the like) of a subscriber (e.g., an owner of a UE). For example, the SM PCF may interact with a charging function (CHF) so that the SM PCF can obtain policy counters for account limits that are maintained in the CHF. The account limits may enable a carrier to implement services in which the SM PCF controls a maximum throughput that a subscriber may receive or a priority for the subscriber traffic based on the account limits. This enables the provider to tune QoS and priority attributes based on monthly throughput limits (e.g., a full speed for a particular quantity of data usage and then a reduced speed for a remainder of a time period), time-of-day (e.g., a reduced speed during peak hours but a higher speed during nights and weekends), temporary promotions (e.g., higher speeds for a particular quantity of hours for an additional price), and/or the like. The interaction between the SM PCF and the CHF provides a rich service environment that the provider can use to customize the subscriber's experience.

However, the account limits (e.g., spending limits) are utilized by a session management policy control service to only determine session management-related policy decisions. The account limits are not utilized to provide non-session management services by the AM PCF and the UE PCF. Because the account limits are not utilized to provide non-session management services by the AM PCF and the UE PCF, network providers are unable to provide non-session management services based on the account limits to subscribers. Thus, current techniques for providing non-session management services waste computing resources (e.g., processing resources, memory resources, communication resources, and/or the like), networking resources, and/or the like associated with handling poor subscriber experience issues associated with non-session management services, failing to provide an improved subscriber experience for non-session management services, lost service opportunities by the provider, and/or the like.

Some implementations described herein include a network device (e.g., a PCF) that utilizes account limits (e.g., spending limits) to determine policy decisions not related to session management. For example, the network device may receive a first request for determination of a first non-session management policy control decision for a UE. The network device may provide an account limits request to another network device (e.g., a CHF) based on the first request. The network device may receive, from the other network device, account limits associated with the UE based on the account limits request. The network device may determine a first non-session management policy control service for the UE based on the first request and based on the account limits. The network device may cause the UE to be provisioned with the first non-session management policy control service. The network device may receive a second request for determination of a second non-session management policy control decision for the UE. The network device may determine a second non-session management policy control service for the UE based on the second request and based on the account limits. The network device may cause the UE to be provisioned with the second non-session management policy control service.

In this way, the network device utilizes account limits to determine policy decisions not related to session management. The network device may utilize a subscriber's account limits when making non-session management related policy decisions. An interaction between the network device and a CHF may be triggered once an access and mobility (AM) policy control association or a UE policy control association is created. The network device may utilize the subscriber's account limits when making AM and/or UE policy decisions. Subsequently, when an SM policy control association is created, interaction with the CHF is not needed since the network device already has the subscriber's account limits and is able to use the subscriber's account limits when making policy decisions.

FIGS. 1A-1E are diagrams of an example 100 associated with utilizing account limits to determine policy decisions not related to session management. As shown in FIGS. 1A-1E, example 100 includes a UE 102 associated with a radio access network (RAN) 104 and a core network 115 that includes an AMF 106, an SMF 108, a PCF 110, and a CHF 112. The UE 102, the RAN 104, the AMF 106, the SMF 108, the PCF 110, the CHF 112, and the core network 115 are described in greater detail below with respect to FIGS. 2 and 3.

As shown in FIG. 1A, the UE 102 provides a registration request to the RAN 104. The UE 102 may provide the registration request to register with the core network 115 and/or to receive services provided by the core network 115. In some implementations, the registration request includes an initial registration request message. For example, the UE 102 may send an initial registration request message to the AMF 106 via the RAN 104 when the UE 102 first connects to the RAN 104. The initial registration request may include information that identifies the UE 102 (e.g., a mobile device number (MDN), an international mobile equipment identity (IMEI), a temporary mobile subscriber identity (TMSI), and/or the like), information that indicates one or more capabilities of the UE 102 (e.g., one or more communication capabilities of the UE 102), information that indicates one or more characteristics associated with the UE 102 (e.g., a location of the UE 102, a movement of the UE 102, and/or the like), authentication information associated with the UE 102, and/or the like.

As shown in FIG. 1A, the RAN 104 provides the registration request and the authentication information associated with the UE 102 to the AMF 106. In some implementations, the AMF 106 may authenticate the UE 102 based on the authentication information. The AMF 106 may process the registration request to generate a first request for determination of a first non-session management policy control decision for the UE 102 based on authenticating the UE 102. The first request may include a request associated with access and mobility policy control. The AMF 106 may provide the first request for determination of the first non-session management policy control decision to the PCF 110.

The PCF 110 may include a session management policy control function (SM PCF), an access and mobility related policy control function (AM PCF), and a UE policy control function (UE PCF). The SM PCF may utilize session management policies to control a quality of service (QoS), charging characteristics, and/or the like associated with PDU sessions. The AM PCF may utilize access and mobility policies to, for example, control service area restrictions, to control AM PCF services (e.g., access to a millimeter wave spectrum during an off-peak time period, on-demand access to the millimeter wave spectrum, a limited duration access to the millimeter wave spectrum, and/or the like), and/or to specify a Radio Access Technology/Frequency Selection Priority (RFSP) index that defines the spectrum permissions that apply to a UE 102. The UE PCF may utilize UE policies to, for example, control access network discovery and selection policy information (e.g., WLAN selection information, Non-3GPP Interworking Function (N3IWF) selection information, Evolved Packet Data Gateway (ePDG) selection information, and/or the like), UE Route Selection Policy (URSP) information (e.g., association of an application with a PDU session, slice selection, and/or the like), and/or UE PCF services (e.g., access to a mobile edge cloud offload site during an off-peak time period, on-demand access to the mobile edge cloud offload site, a limited duration access to the mobile edge cloud offload site, and/or the like).

In some implementations, the PCF 110 may comprise a single device. For example, the SM PCF, the AM PCF, and the UE PCF may be included in the same network device. In these implementations, the AMF 106 may provide the first request for determination of the first non-session management policy control decision to the single device.

In some implementations, the PCF 110 may comprise multiple devices. For example, the SM PCF may be included in a first network device, the AM PCF may be included in a second network device, and the UE PCF may be included in the second network device or a third network device.

As shown by reference number 120, the PCF 110 receives, from the AMF 106, the first request for determination of the first non-session management policy control decision for the UE 102. The PCF 110 may determine whether information identifying account limits associated with the UE 102 is stored in a data structure (e.g., a database, a table, a list, and/or the like) stored in a memory associated with the PCF 110. The information identifying the account limits may include information identifying AM PCF services (e.g., time of day (e.g., between 8:00 pm and 5:00 am, during weekends, and/or the like), access to high speed millimeter wave spectrum, on-demand access to high speed millimeter wave spectrum, limited duration (e.g., one hour, one day, and/or the like) access to high speed millimeter wave spectrum, and/or the like) and/or UE PCF services (e.g., time of day access to mobile edge cloud resources, on-demand access to mobile edge cloud resources, limited duration access to mobile edge cloud resources, and/or the like) associated with the UE 102.

In some implementations, the PCF 110 determines that the information identifying the account limits associated with the UE 102 is stored in the data structure, as described below with respect to FIG. 1C. In some implementations, the PCF 110 determines that the information identifying the account limits associated with the UE 102 is not stored in the data structure. The PCF 110 may generate a account limits request to obtain the information identifying the account limits associated with the UE 102 from the CHF 112.

Figure 1B:
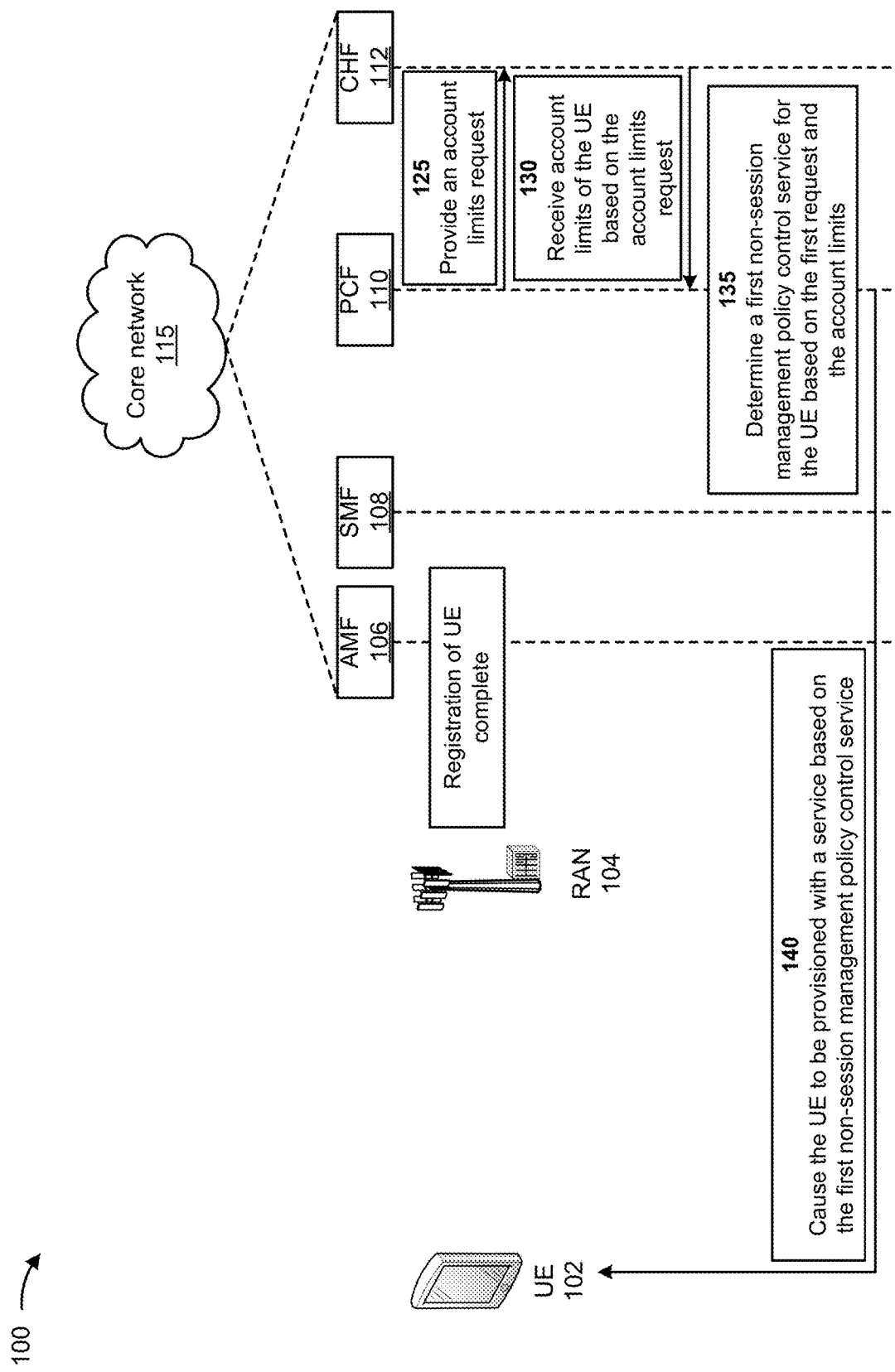

As shown in FIG. 1B, and by reference number 125, the PCF 110 provides the account limits request to the CHF 112. In some implementations, the PCF 110 provides the account limits request to the CHF 112 based on a first access and mobility policy control association and/or a first UE policy control association being created.

In some implementations, the AM PCF and the UE PCF are included in the same device and the PCF 110 provides a single account limits request to the CHF 112. For example, the PCF 110 may provide, to the CHF 112, a account limits request to obtain information identifying the account limits associated with AM PCF services associated with the UE 102 and information identifying the account limits associated with UE PCF services associated with the UE 102.

In some implementations, the SM PCF may be included in the same device as the AM PCF and the UE PCF, and the PCF 110 may provide the account limits request to the CHF 112 to also obtain information identifying account limits associated with SM PCF services associated with the UE 102. By obtaining the information identifying account limits associated with SM PCF services associated with the UE 102, the PCF 110 may be able to make session management policy control decisions based on subscriber account limits (e.g., manage priority attributes on periodic (e.g., monthly) throughput limits associated with the UE 102, time-of-day data rate limits associated with the UE 102, and/or the like) without having to obtain the information identifying the account limits associated with SM PCF services from the CHF 112, as described in greater detail below.

In some implementations, the AM PCF and the UE PCF are included in different devices, and the AM PCF and the UE PCF may each provide an account limits request to the CHF 112. For example, the AM PCF may provide, to the CHF 112, a first account limits request to obtain information identifying the account limits associated with AM PCF services associated with the UE 102, and the UE PCF may provide, to the CHF 112, a second account limits request to obtain information identifying the account limits associated with UE PCF services associated with the UE 102.

The CHF 112 may receive the account limits request(s) and may obtain information identifying the account limits associated with the UE 102 based on the request. For example, the account limits request(s) may include information identifying the UE 102, and the CHF 112 may obtain the information identifying the account limits based on accessing a data structure storing information mapping information identifying UEs to information identifying account limits associated with the UEs. The CHF 112 may provide the information identifying the account limits associated with the UE 102 to the PCF 110. As shown by reference number 130, the PCF 110 receives the information identifying the account limits associated with the UE 102 from the CHF 112.

As shown by reference number 135, the PCF 110 determines a first non-session management policy control service for the UE 102 based on the first request and the account limits associated with the UE 102. For example, the PCF 110 may determine one or more AM PCF services (e.g., access to millimeter wave spectrum during an off-peak time period, on-demand access to the millimeter wave spectrum, a limited duration access to the millimeter wave spectrum, and/or the like) associated with the UE 102 and/or one or more UE PCF services (e.g., access to a mobile edge cloud offload site during an off-peak time period, on-demand access to the mobile edge cloud offload site, a limited duration access to the mobile edge cloud offload site, and/or the like) associated with the UE 102 based on the account limits associated with the UE 102. The PCF 110 may store the information identifying the account limits associated with the UE 102 in the data structure stored in the memory associated with the PCF 110.

In some implementations, the PCF 110 determines the first non-session management policy control service for the UE 102 prior to receiving the account limits associated with the UE 102 from the CHF 112. Upon receiving the account limits associated with the UE 102, the PCF 110 may determine whether to modify the first non-session management policy control service for the UE 102 based on the account limits. If the PCF 110 determines to modify the first non-session management policy control service for the UE 102, the PCF 110 may initiate a process with the AMF 106 to generate and/or provide the modified first non-session management policy control service to the AMF 106.

As shown by reference number 140, the PCF 110 causes the UE 102 to be provisioned with a service based on the first non-session management policy control service. In some implementations, the PCF 110 utilizes one or more devices included in the core network 115 to cause the UE 102 to be provisioned with the first non-session management policy control service. For example, the PCF 110 may provide a message identifying the one or more AM PCF services and/or the one or more UE PCF services associated with the UE 102 to the AMF 106, to cause the AMF 106 to provision the one or more AM PCF services and/or the one or more UE PCF services to the UE 102.

Figure 1C:
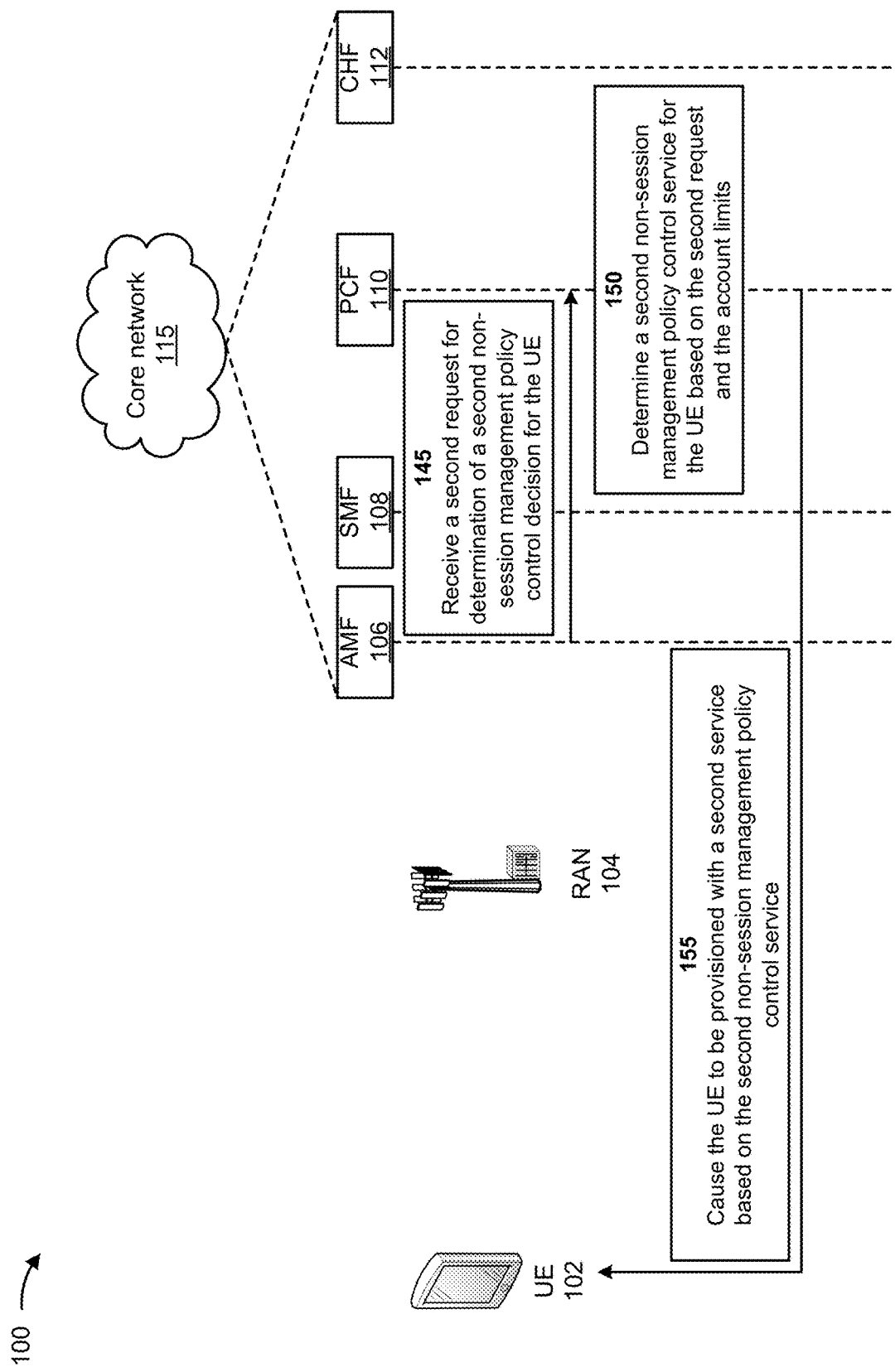

As shown in FIG. 1C, and by reference number 145, the PCF 110 receives a second request for determination of a second non-session management policy control decision for the UE 102. The second request may be associated with a UE policy control request. The AMF 106 may generate the second request for determination of a second non-session management policy control decision for the UE 102 and may provide the second request for determination of the second non-session management policy control decision to the PCF 110.

The PCF 110 may determine that information identifying the account limits associated with the UE 102 is stored in the data structure. For example, the second request for determination of the second non-session management policy control decision may include information that identifies the UE 102, and the PCF 110 may obtain the information identifying the account limits associated with the UE 102 based on the information that identifies the UE 102.

As shown by reference number 150, the PCF 110 determines a second non-session management policy control service for the UE 102 based on the second request and the account limits. In some implementations, the PCF 110 determines a second non-session management policy control service for the UE 102 based on a second access and mobility policy control association and/or a second UE policy control association being created. In some implementations, the PCF 110 determines the second non-session management policy control service for the UE 102 in a manner similar to that described above with respect to determining the first non-session management policy control service for the UE 102. By utilizing the information identifying the account limits associated with the UE 102 stored in the data structure, the PCF 110 may make non-session management policy decisions for the UE 102 without having to provide a request for information identifying account limits associated with the UE 102 to the CHF 112. In this way, the PCF 110 may conserve computing resources that otherwise would have been utilized to obtain the information identifying the account limits from the CHF 112.

As shown by reference number 155, the PCF 110 causes the UE 102 to be provisioned with a second service based on the second non-session management policy control service. In some implementations, the PCF 110 causes the UE 102 to be provisioned with the second service in a manner similar to that described above.

Figure 1D:
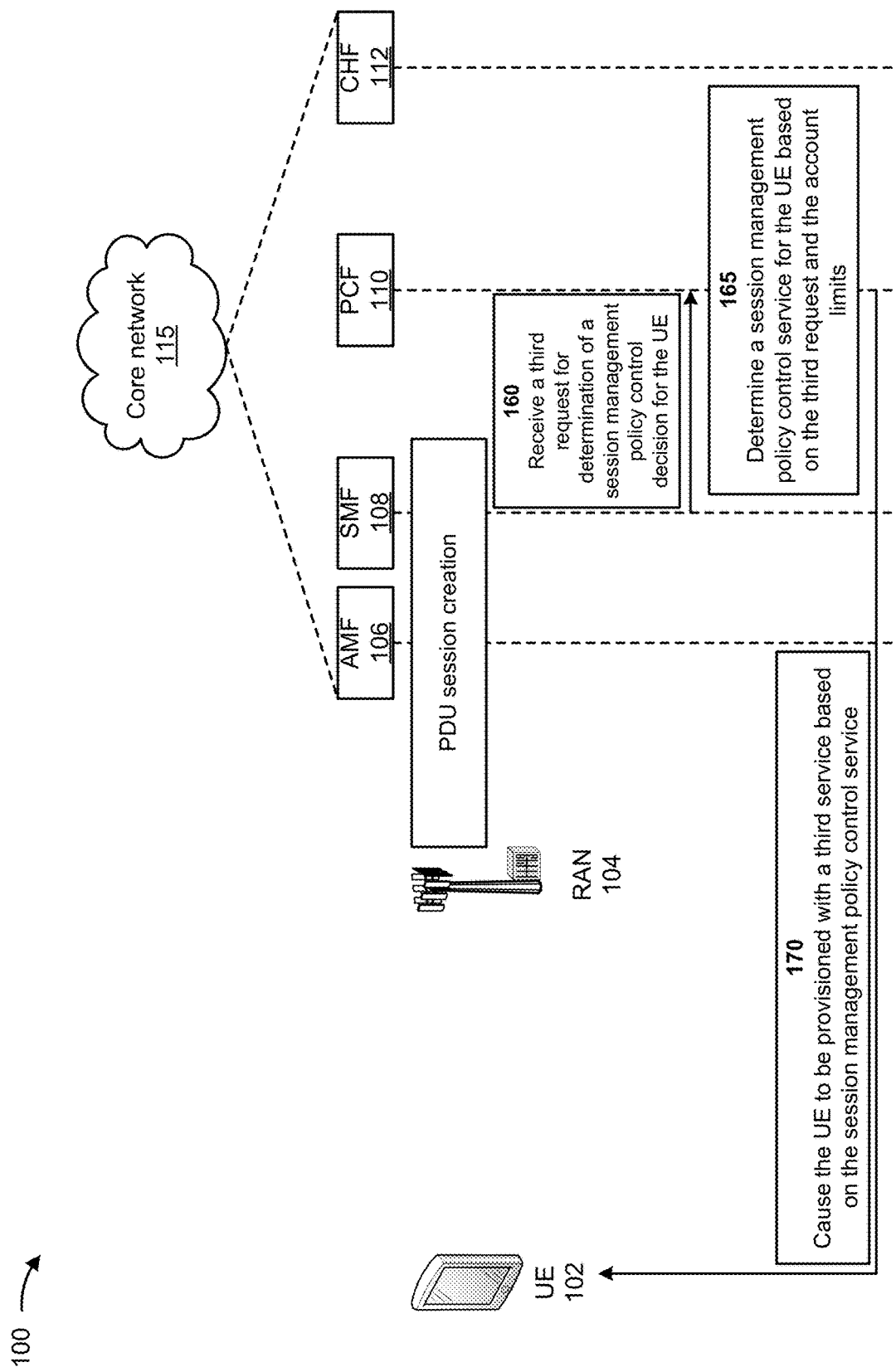

As shown in FIG. 1D, and by reference number 160, the PCF 110 receives a third request for determination of a session management policy control decision for the UE 102 from the SMF 108. The PCF 110 may receive the third request for determination of the session management policy control decision for the UE 102 based on a PDU session being established for the UE 102. For example, a PDU session may be established for the UE 102 based on the first non-session management policy control service and the second non-session management policy control service.

In some implementations, the SM PCF is included in the same device as the AM PCF and/or the UE PCF, and the PCF 110 determines that the information identifying the account limits associated with the UE is stored in the data structure based on the third request for determination of the session management policy control decision. The PCF 110 may obtain the information identifying the account limits with the SM PCF services in a manner similar to that described above.

As shown by reference number 165, the PCF 110 determines a session management policy control service for the UE 102 based on the third request and the account limits. The session management policy control service may include an SM PCF service. For example, the session management policy control service may include a service that defines a maximum throughput for the UE 102, a service that defines a priority for traffic associated with the UE 102, and/or the like.

As shown by reference number 170, the PCF 110 causes the UE 102 to be provisioned with a third service (e.g., an SM PCF service) based on the session management policy control service. For example, the PCF 110 may provide information associated with the session management policy control service to the SMF 108 and/or the RAN 104 to cause the UE 102 to be provisioned with the third service.

Figure 1E:
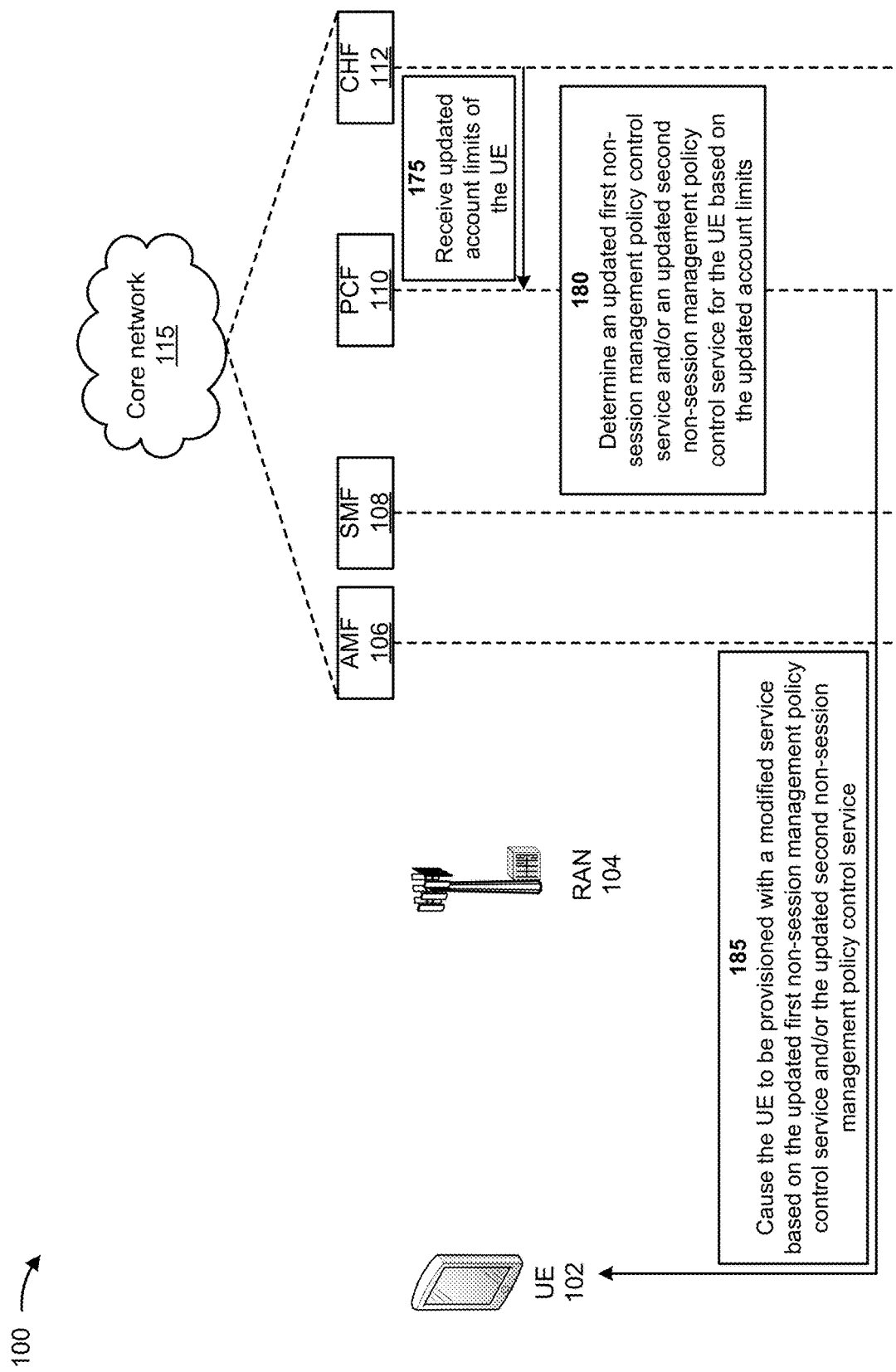

As shown in FIG. 1E, and by reference number 175, the PCF 110 receives updated account limits of the UE 102 from the CHF 112. For example, the PCF 110 may receive updated account limits associated with an AM PCF service and/or a UE PCF service associated with the UE 102 from the CHF 112. The PCF 110 may determine that the AM PCF service and/or the UE PCF service is provisioned to the UE 102 based on the first non-session management policy control service and/or the second non-session management policy control service.

As shown by reference number 180, the PCF 110 determines an updated first non-session management policy control service and/or an updated second non-session management policy control service for the UE 102 based on the updated account limits. In some implementations, the PCF 110 determines the updated first non-session management policy control service and/or the updated second non-session management policy control service for the UE 102 based on the updated account limits in a manner similar to that described above with respect to determining the first non-session management policy control service and/or the second non-session management policy control service.

As shown by reference number 185, the PCF 110 causes the UE 102 to be provisioned with a modified service based on the updated first non-session management policy control service and/or the updated second non-session management policy control service. For example, the PCF 110 may provide, to the AMF 106, a first message associated with modifying the first service based on the updated first non-session management policy control service to cause the UE 102 to be provisioned with a modified first service. Alternatively, and/or additionally, the PCF 110 may provide, to the AMF 106, a second message associated with modifying the second service based on the updated second non-session management policy control service to cause the UE 102 to be provisioned with a modified second service. In some implementations, the PCF 110 causes the UE 102 to be provisioned with the modified service in a manner similar to that described above.

In some implementations, the PCF 110 may implement an SM policy change based on the updated account limits. The PCF 110 may provide information associated with the SM policy change to the SMF 108.

In this way, the PCF 110 utilizes account limits to determine policy decisions not related to session management. The PCF 110 may utilize a subscriber's account limits (e.g., spending limits associated with a UE) when making non-session management related policy decisions. An interaction between the PCF 110 and the CHF 112 may be triggered once an access and mobility policy control association or a UE policy control association is created. The PCF 110 may utilize the subscriber's account limits when making AM and/or UE policy decisions. Subsequently, when an SM policy control association is created, interaction with the CHF 112 is not needed since the PCF 110 already has the subscriber's account limits and is able to use the subscriber's account limits when making policy decisions. Thus, the PCF 110 conserves computing resources, networking resources, and/or the like associated with handling poor subscriber experience issues associated with non-session management services, failing to provide an improved subscriber experience for non-session management services, lost service opportunities by the provider, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
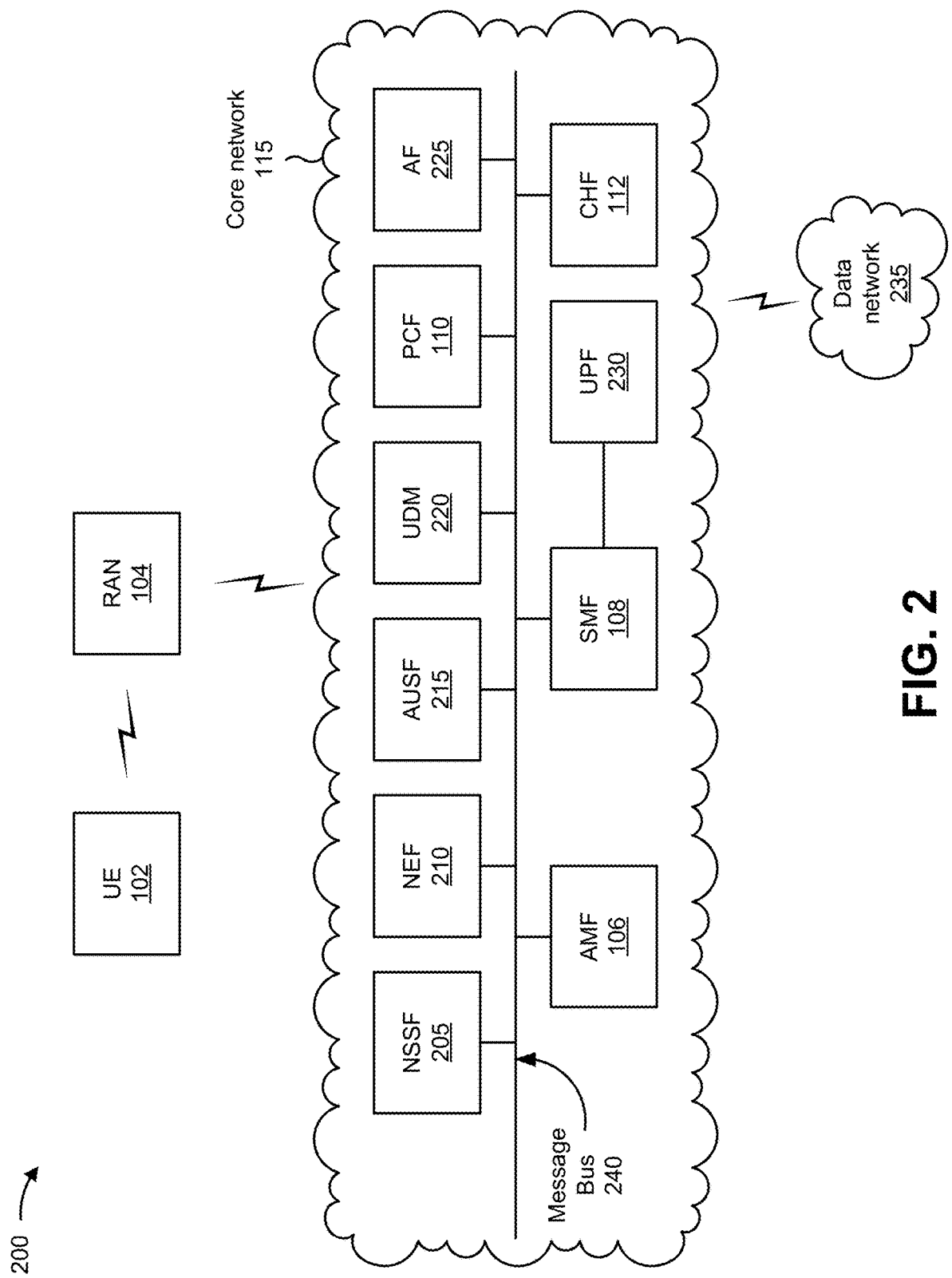
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include UE 102, RAN 104, core network 115, and a data network 235. Devices and/or networks of example environment 200 may interconnect via wired connections, wireless connections, or a combination of wired and wireless connections.

UE 102 includes one or more devices capable of receiving, generating, storing, processing, and/or providing information, such as information described herein. For example, UE 102 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

RAN 104 may support, for example, a cellular RAT. RAN 104 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 102. RAN 104 may transfer traffic between UE 102 (e.g., using a cellular RAT), one or more base stations (e.g., using a wireless interface or a backhaul interface, such as a wired backhaul interface), and/or core network 115. RAN 104 may provide one or more cells that cover geographic areas.

In some implementations, RAN 104 may perform scheduling and/or resource management for UE 102 covered by RAN 104 (e.g., UE 102 covered by a cell provided by RAN 104). In some implementations, RAN 104 may be controlled or coordinated by a network controller, which may perform load balancing, network-level configuration, and/or other operations. The network controller may communicate with RAN 104 via a wireless or wireline backhaul. In some implementations, RAN 104 may include a network controller, a self-organizing network (SON) module or component, or a similar module or component. In other words, RAN 104 may perform network control, scheduling, and/or network management functions (e.g., for uplink, downlink, and/or sidelink communications of UE 102 covered by RAN 104).

In some implementations, core network 115 may include an example functional architecture in which systems and/or methods described herein may be implemented. For example, core network 115 may include an example architecture of a fifth generation (5G) next generation (NG) core network included in a 5G wireless telecommunications system. While the example architecture of core network 115 shown in FIG. 2 may be an example of a service-based architecture, in some implementations, core network 115 may be implemented as a reference-point architecture and/or a 4G core network, among other examples.

As shown in FIG. 2, core network 115 may include a number of functional elements. The functional elements may include, for example, a network slice selection function (NSSF) 205, a network exposure function (NEF) 210, an authentication server function (AUSF) 215, a unified data management (UDM) component 220, a PCF 110, an application function (AF) 225, an AMF 106, an SMF 108, a user plane function (UPF) 230, and/or a CHF 112. These functional elements may be communicatively connected via a message bus 240. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

NSSF 205 includes one or more devices that select network slice instances for UE 102. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating UE 102 in the wireless telecommunications system.

UDM 220 includes one or more devices that store user data and profiles in the wireless telecommunications system. UDM 220 may be used for fixed access and/or mobile access in core network 115.

PCF 110 includes one or more devices that provide a policy framework that incorporates network slicing, roaming, packet processing, and/or mobility management, among other examples.

AF 225 includes one or more devices that support application influence on traffic routing, access to NEF 210, and/or policy control, among other examples.

AMF 106 includes one or more devices that act as a termination point for non-access stratum (NAS) signaling and/or mobility management, among other examples.

SMF 108 includes one or more devices that support the establishment, modification, and release of communication sessions in the wireless telecommunications system. For example, SMF 108 may configure traffic steering policies at UPF 230 and/or may enforce user equipment IP address allocation and policies, among other examples.

UPF 230 includes one or more devices that serve as an anchor point for intraRAT and/or interRAT mobility. UPF 230 may apply rules to packets, such as rules pertaining to packet routing, traffic reporting, and/or handling user plane QoS, among other examples.

CHF 112 includes one or more devices that allow charging services to be offered to authorized network functions. CHF 112 may also support converged online and offline charging.

Message bus 240 represents a communication structure for communication among the functional elements. In other words, message bus 240 may permit communication between two or more functional elements.

Data network 235 includes one or more wired and/or wireless data networks. For example, data network 235 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
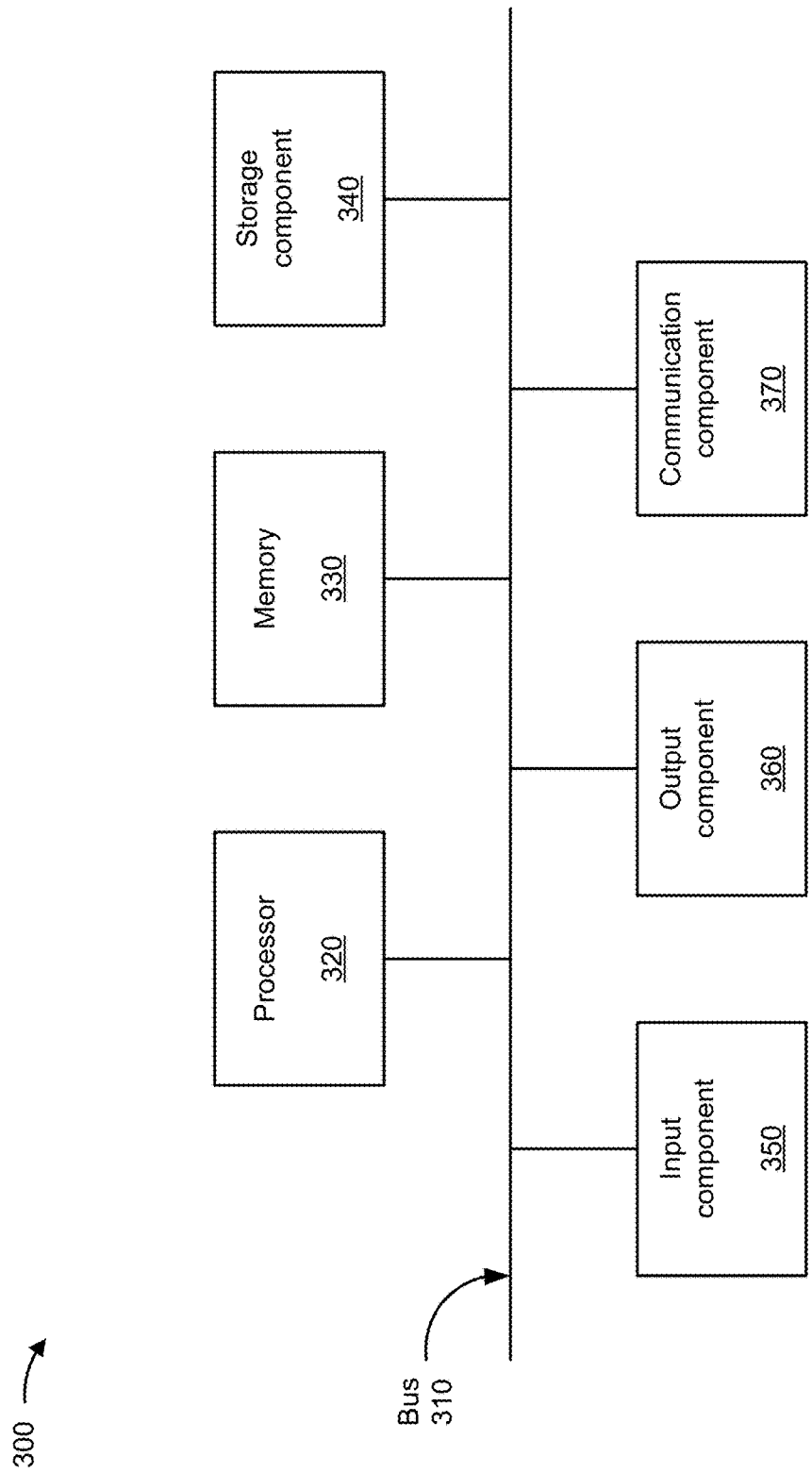
FIG. 3 is a diagram of example components of one or more devices of FIG. 2.

FIG. 3 is a diagram of example components of a device 300, which may correspond to UE 102, RAN 104, NEF 210, AUSF 215, UDM 220, a PCF 110, AF 225, AMF 106, SMF 108, UPF 230, and/or CHF 112. In some implementations, UE 102, RAN 104, NEF 210, AUSF 215, UDM 220, a PCF 110, AF 225, AMF 106, SMF 108, UPF 230, and/or CHF 112 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
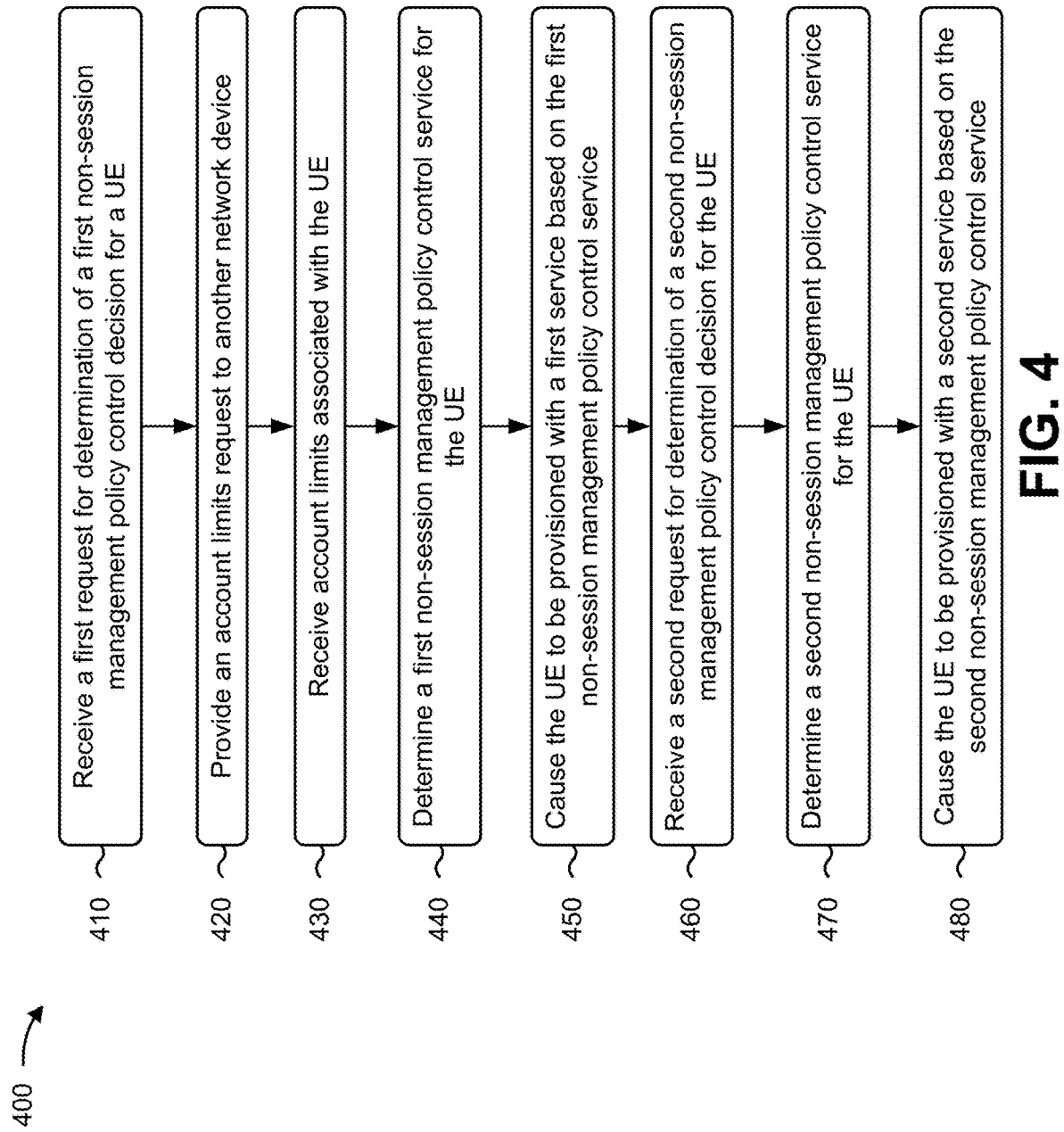
FIG. 4 is a flowchart of an example process for utilizing limits to determine policy decisions not related to session management.

FIG. 4 is a flowchart of an example process 400 for utilizing account limits to determine policy decisions not related to session management. In some implementations, one or more process blocks of FIG. 4 may be performed by a network device (e.g., PCF 110). In some implementations, one or more process blocks of FIG. 4 may be performed by another device or a group of devices separate from or including the network device, such as an NSSF (e.g., NSSF 205), an NEF (e.g., NEF 210), an AUSF (e.g., AUSF 215), a UDM (e.g., UDM 220), an AF (e.g., AF 225), an AMF (e.g., AMF 106), an SMF (e.g., SMF 108), a UPF (e.g., UPF 230), and/or a CHF (e.g., CHF 112). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving a first request for determination of a first non-session management policy control decision for a UE (block 410). For example, the network device may receive a first request for determination of a first non-session management policy control decision for a UE, as described above. The network device may be associated with a core network that registers and authenticates the UE and/or that creates a PDU session for the UE. For example, the network device may be associated with a 5G NR core network. In some implementations, the network device includes a charging function. In some implementations, the network device is a PCF device.

As further shown in FIG. 4, process 400 may include providing an account limits request to another network device (block 420). For example, the network device may provide an account limits request to another network device based on the first request, as described above.

As further shown in FIG. 4, process 400 may include receiving account limits associated with the UE (block 430). For example, the network device may receive, from the other network device, account limits associated with the UE based on the account limits request, as described above.

As further shown in FIG. 4, process 400 may include determining a first non-session management policy control service for the UE (block 440). For example, the network device may determine a first non-session management policy control service for the UE based on the first request and based on the account limits, as described above. The first non-session management policy control service may include access to a high-speed millimeter wave spectrum during an off-peak time period, access to the high-speed millimeter wave spectrum on demand, and/or a limited duration access to the high-speed millimeter wave spectrum.

As further shown in FIG. 4, process 400 may include causing the UE to be provisioned with a first service based on the first non-session management policy control service (block 450). For example, the network device may cause the UE to be provisioned with a first service based on the first non-session management policy control service, as described above. In some implementations, the network device may be associated with a core network and may utilize the core network to provision the UE with the first service.

As further shown in FIG. 4, process 400 may include receiving a second request for determination of a second non-session management policy control decision for the UE (block 460). For example, the network device may receive a second request for determination of a second non-session management policy control decision for the UE, as described above.

As further shown in FIG. 4, process 400 may include determining a second non-session management policy control service for the UE (block 470). For example, the network device may determine a second non-session management policy control service for the UE based on the second request and based on the account limits, as described above. The second non-session management policy control service may include access to mobile edge cloud offload sites during an off-peak time period, access to the mobile edge cloud offload sites on demand, and/or a limited duration access to the mobile edge cloud offload sites.

As further shown in FIG. 4, process 400 may include causing the UE to be provisioned with a second service based on the second non-session management policy control service (block 480). For example, the network device may cause the UE to be provisioned with a second service based on the second non-session management policy control service, as described above. In some implementations, the network device may be associated with a core network and may utilize the core network to provision the UE with the second non-session management policy control service. In some implementations, the network device may cause a PDU session to be established for the UE based on the first non-session management policy control service and the second non-session management policy control service.

In some implementations, the network device may receive a third request for determination of a session management policy control decision for the UE. The network device may determine a session management policy control service for the UE based on the third request and based on the account limits. The network device may cause the UE to be provisioned with a third service based on the session management policy control service. The session management policy control service may include a service that defines a maximum throughput for the UE and/or a service that defines a priority for traffic associated with the UE.

In some implementations, the network device may receive updated account limits associated with the UE. The network device may determine an updated first non-session management policy control service and/or an updated second non-session management policy control service for the UE based on the updated account limits. The network device may cause the UE to be provisioned with a modified service based on the updated first non-session management policy control service and/or the updated second non-session management policy control service. In some implementations, the network device may determine an updated session management policy based on the updated account limits. The network device may cause a session management service to be modified based on the updated session management policy.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a network device, a first request for determination of a first non-session management policy control decision for a user equipment;
providing, by the network device, an account limits request to another network device based on the first request;
receiving, by the network device and from the other network device, account limits associated with the user equipment based on the account limits request;
determining, by the network device, a first non-session management policy control service for the user equipment based on the first request and based on the account limits;
determining a first service for the user equipment based on the first non-session management policy control service;
receiving, by the network device, a second request for determination of a second non-session management policy control decision for the user equipment;
determining, by the network device, a second non-session management policy control service for the user equipment based on the second request and based on the account limits; and
determining a second service for the user equipment based on the second non-session management policy control service,
wherein the first service and the second service are provided to the user equipment.

2. The method of claim 1, further comprising:
receiving a third request for determination of a session management policy control decision for the user equipment;
determining a session management policy control service for the user equipment based on the third request and based on the account limits; and
causing the user equipment to be provisioned with a third service based on the session management policy control service.

3. The method of claim 2, wherein the session management policy control service includes one or more of:
   a service that defines a maximum throughput for the user equipment, or
   a service that defines a priority for traffic associated with the user equipment.

4. The method of claim 1, further comprising:
   receiving updated account limits associated with the user equipment;
   determining an updated first non-session management policy control service or an updated second non-session management policy control service for the user equipment based on the updated account limits; and
   causing the user equipment to be provisioned with a modified service based on the updated first non-session management policy control service or the updated second non-session management policy control service.

5. The method of claim 4, further comprising:
   determining an updated session management policy based on the updated account limits; and
   causing a session management service associated with the user equipment to be modified based on the updated session management policy.

6. The method of claim 1, wherein the first non-session management policy control service includes one or more of:
   access to a millimeter wave spectrum during an off-peak time period,
   access to the millimeter wave spectrum on demand, or
   a limited duration access to the millimeter wave spectrum.

7. The method of claim 1, wherein the second non-session management policy control service includes one or more of:
   access to mobile edge cloud offload sites during an off-peak time period,
   access to the mobile edge cloud offload sites on demand, or
   a limited duration access to the mobile edge cloud offload sites.

8. A network device, comprising:
   one or more processors configured to:
      receive a first request for determination of a first non-session management policy control decision for a user equipment;
      provide an account limits request to another network device based on the first request;
      receive, from the other network device, account limits associated with the user equipment based on the account limits request;
      determine a first non-session management policy control service for the user equipment based on the first request and based on the account limits,
         wherein the first non-session management policy control service is associated with access to a high-speed millimeter wave spectrum;
      cause the user equipment to be provisioned with a first service based on the first non-session management policy control service;
      receive a second request for determination of a second non-session management policy control decision for the user equipment;
      determine a second non-session management policy control service for the user equipment based on the second request and based on the account limits,
         wherein the second non-session management policy control service is associated with access to mobile edge cloud offload sites; and
      cause the user equipment to be provisioned with a second service based on the second non-session management policy control service.

9. The network device of claim 8, wherein the network device is a policy control function device.

10. The network device of claim 8, wherein the other network device includes a charging function.

11. The network device of claim 8, wherein the network device is associated with a core network that registers and authenticates the user equipment and that creates a protocol data unit session for the user equipment.

12. The network device of claim 8, wherein the network device is associated with a core network, and the one or more processors, when causing the user equipment to be provisioned with the first service, are configured to:
   utilize the core network to provision the user equipment with the service based on the first non-session management policy control service.

13. The network device of claim 8, wherein the network device is associated with a core network, and the one or more processors, when causing the user equipment to be provisioned with the second non-session management policy control service, are configured to:
   utilize the core network to provision the user equipment with the second service based on the second non-session management policy control service.

14. The network device of claim 8, wherein the one or more processors are further configured to:
   receive updated account limits associated with the user equipment;
   determine an updated first non-session management policy control service or an updated second non-session management policy control service for the user equipment based on the updated account limits; and
   cause the user equipment to be provisioned with a modified service based on the updated first non-session management policy control service or the updated second non-session management policy control service.

15. A non-transitory computer-readable medium storing a set of instructions, the set of instructions comprising:
   one or more instructions that, when executed by one or more processors of a network device, cause the network device to:
      receive a first request for determination of a first non-session management policy control decision for a user equipment;
      provide an account limits request to another network device based on the first request;
      receive, from the other network device, account limits associated with the user equipment based on the account limits request;
      determine a first non-session management policy control service for the user equipment based on the first request and based on the account limits;
      cause the user equipment to be provisioned with a first service based on the first non-session management policy control service;
      receive a second request for determination of a second non-session management policy control decision for the user equipment;
      determine a second non-session management policy control service for the user equipment based on the second request and based on the account limits;
      cause the user equipment to be provisioned with a second service based on the second non-session management policy control service;

receive a third request for determination of a session management policy control decision for the user equipment;

determine a session management policy control service for the user equipment based on the third request and based on the account limits; and cause the user equipment to be provisioned with a third service based on the session management policy control service.

16. The non-transitory computer-readable medium of claim 15, wherein the one or more instructions further cause the network device to:

receive updated account limits associated with the user equipment;

determine an updated first non-session management policy control service or an updated second non-session management policy control service for the user equipment based on the updated account limits; and cause the user equipment to be provisioned with a modified service based on the updated first non-session management policy control service or the updated second non-session management policy control service.

17. The non-transitory computer-readable medium of claim 15, wherein:

the first non-session management policy control service includes one or more of:

access to a millimeter wave spectrum during an off-peak time period, access to the millimeter wave spectrum on demand, or a limited duration access to the millimeter wave spectrum; and the second non-session management policy control service includes one or more of:

access to mobile edge cloud offload sites during an off-peak time period, access to the mobile edge cloud offload sites on demand, or a limited duration access to the mobile edge cloud offload sites.

18. The non-transitory computer-readable medium of claim 15, wherein the network device is associated with a core network and the one or more instructions, that cause the network device to cause the user equipment to be provisioned with the first service, cause the network device to:

utilize the core network to provision the user equipment with the first service.

19. The non-transitory computer-readable medium of claim 15, wherein the network device is associated with a core network and the one or more instructions, that cause the network device to cause the user equipment to be provisioned with the second service, cause the network device to:

utilize the core network to provision the user equipment with the second service.

20. The non-transitory computer-readable medium of claim 15, wherein the network device includes a policy control function device and the other network device includes a charging function.

* * * * *